(12) United States Patent
Dong et al.

(10) Patent No.: US 11,891,917 B2
(45) Date of Patent: Feb. 6, 2024

(54) METHOD FOR MEASURING SURFACE TEMPERATURES OF TURBINE BLADE

(71) Applicant: North University of China, Taiyuan (CN)

(72) Inventors: Helei Dong, Taiyuan (CN); Qiulin Tan, Taiyuan (CN); Jijun Xiong, Taiyuan (CN); Lei Zhang, Taiyuan (CN); Yanyan Niu, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 18/326,621

(22) Filed: May 31, 2023

(65) Prior Publication Data
US 2023/0392509 A1 Dec. 7, 2023

(30) Foreign Application Priority Data
Jun. 1, 2022 (CN) .......................... 202210614843.5

(51) Int. Cl.
*F01D 5/28* (2006.01)
*F01D 17/08* (2006.01)
(Continued)

(52) U.S. Cl.
CPC .......... *F01D 5/288* (2013.01); *C23C 28/3215* (2013.01); *C23C 28/345* (2013.01); *F01D 17/085* (2013.01); *F01D 21/003* (2013.01); *F05D 2230/90* (2013.01); *F05D 2270/80* (2013.01); *F05D 2300/175* (2013.01); *F05D 2300/611* (2013.01)

(58) Field of Classification Search
CPC ................. F01D 5/288; F05D 2230/90; F05D 2300/175; C23C 28/3215; C23C 28/345
USPC ....................................................... 374/179
See application file for complete search history.

(56) References Cited

FOREIGN PATENT DOCUMENTS

CN 101784951 A 7/2010
CN 101894904 A * 11/2010
(Continued)

OTHER PUBLICATIONS

Chengcheng Cui "Research on thin film thermal resistance temperature sensor prepared on blade" A Master Thesis Submitted to University of Electronic Science and Technology of China, 2021.
(Continued)

*Primary Examiner* — Mirellys Jagan
(74) *Attorney, Agent, or Firm* — Stuart H. Mayer; Kaplan Breyer Schwarz LLP

(57) ABSTRACT

A method for measuring surface temperature of a turbine blade includes following steps: step 1: cleaning a turbine blade and blowing dry; step 2: firstly, preparing a NiCrAlY (nickel-chromium-aluminum-yttrium) buffer layer and then preparing an YSZ (yttria-stabilized zirconia) insulating layer; step 3, preparing alumina sol; step 4, preparing an alumina insulating layer; step 5, preparing a strip-shaped platinum electrode layer; step 6, preparing a platinum-filled lead wire; step 7: firstly, connecting a platinum wire to a surface of a tail end of the strip-shaped platinum electrode layer, and then connecting a nickel-chromium alloy wire to a tenon end of the turbine blade; step 8, preparing alumina protective layers; and step 9, connecting two cold junctions of a thermocouple with a data collector.

8 Claims, 2 Drawing Sheets

(51) Int. Cl.
    *F01D 21/00*    (2006.01)
    *C23C 28/00*    (2006.01)

(56)            References Cited

FOREIGN PATENT DOCUMENTS

| CN | 102353469 | A |   | 2/2012  |         |
|----|-----------|---|---|---------|---------|
| CN | 103017922 | A |   | 4/2013  |         |
| CN | 103226171 | A |   | 7/2013  |         |
| CN | 103560204 | A |   | 2/2014  |         |
| CN | 105588652 | A |   | 5/2016  |         |
| CN | 106768441 | A |   | 5/2017  |         |
| CN | 108531848 | A | * | 9/2018  | ............... C23C 4/11 |
| CN | 109338290 | A |   | 2/2019  |         |
| CN | 110129851 | A |   | 8/2019  |         |
| CN | 115628820 | A | * | 1/2023  |         |
| JP | H03210468 | A |   | 9/1991  |         |

OTHER PUBLICATIONS

Jiaoyan, et al. "High Temperature Pressure Sensor Based on SOI Island Film Structure" Micronanoelectronic Technology, vol. 55, No. 9, Sep. 2018.

Li, "Study of Electronical Properties of TBC Coated on Aero-Engine Turbine Blade" Research, 2019.

Li Yunhao, "Induction Heating in the Foundry Industry Lesson 5: Design of Induction Melting" Furnace and Calculation of Inductor Parameters (Part 2) 2020.

* cited by examiner

METHOD FOR MEASURING SURFACE TEMPERATURES OF TURBINE BLADE

CROSS-REFERENCE TO RELATED APPLICATIONS

This application claims priority to Chinese Patent Application No. 202210614843.5, filed on Jun. 1, 2022, the contents of which are hereby incorporated by reference.

TECHNICAL FIELD

The application relates to a turbine blade surface temperature measuring technology, and in particular to a method for measuring the surface temperatures of a turbine blade.

BACKGROUND

With the rapid development of aviation industry, the thrust-to-weight ratio of the new generation of aviation aircraft is constantly increasing, and the performance requirements of aero-engines are also constantly demanding. As the core hot-end component of aero-engine, the performance and service life of turbine blades are directly related to the safe operation of aero-engines. In order to ensure the performance and service life of turbine blades, it is necessary to measure the surface temperature of turbine blades. At present, the methods for measuring surface temperatures of a turbine blade mainly include thin-film thermocouple (generally with thickness level of nanometers to micrometers) and thick-film thermocouple (generally with thickness level of tens of micrometers). These two methods have their own advantages, but they share following problems: first of all, it is necessary for both the thin-film thermocouple and thick-film thermocouple to prepare two different materials on the surface of turbine blades to form thermocouples, which leads to a complicated preparation process and considerable measuring costs; secondly, both the thin-film thermocouple and the thick-film thermocouple are easy to cracking and falling off due to increasing thermal stress at high temperatures, which leads to thermocouple failure and consequently poor measurement reliability. Therefore, it is necessary to invent a new turbine blade surface temperature measurement method to solve the problems of high measurement cost and poor measurement reliability of the existing methods for measuring the surface temperatures of a turbine blade.

SUMMARY

In order to solve the problems of high measurement cost and poor measurement reliability of the existing methods of the turbine blade surface temperature measurement, the application provides a method for measuring the surface temperatures of a turbine blade.

The application is realized by using the following technical scheme:

a method for measuring the surface temperatures of a turbine blade, including following steps:

step 1: cleaning a turbine blade and then blowing dry;

step 2: firstly, preparing a NiCrAlY (nickel-chromium-aluminum-yttrium) buffer layer on a surface of the turbine blade by an ion beam sputtering method, and then preparing a YSZ (yttria-stabilized zirconia) insulating layer on a surface of the NiCrAlY buffer layer by the ion beam sputtering method;

step 3, preparing alumina sol by a sol-gel method;

step 4, preparing an alumina insulating layer on a surface of the YSZ insulating layer by a dipping-coating method;

step 5, preparing a strip-shaped platinum electrode layer on a surface of the alumina insulating layer by a screen-printing method;

step 6, drilling a filling hole on a surface of a starting end of the strip-shaped platinum electrode layer, making a metal surface of the turbine blade exposed through the filling hole, then filling platinum slurry into the filling hole, and then sintering and curing at high temperatures to prepare a platinum-filled lead wire, thereby realizing electrical connection of the surface platinum electrode with the metal turbine blade;

step 7: connecting a platinum wire to a surface of a tail end of the strip-shaped platinum electrode layer, and then connecting a nickel-chromium alloy wire to a tenon end of the turbine blade;

step 8, preparing alumina protective layers on a surface of the strip-shaped platinum electrode layer and alumina insulating layer by adopting the dipping-coating method; in this way, the turbine blade, the strip-shaped platinum electrode layer, the platinum-filled lead wire, the platinum wire and the nickel-chromium alloy wire jointly constitute a thermocouple; the turbine blade is used as a positive pole of thermocouple, the strip-shaped platinum electrode layer and the platinum-filled lead wire together serve as a negative pole of the thermocouple, the platinum wire and the nickel-chromium alloy wire are used as two compensation wires of the thermocouple respectively; a connection point of the platinum-filled lead wire and the turbine blade serves as a hot junction for the thermocouple; and a tail end of platinum wire and a tail end of the nickel-chromium alloy wire are used as two cold junctions of the thermocouple respectively; and;

step 9, connecting the two cold junctions of the aforementioned thermocouple to a data collector, measuring the surface temperature of the turbine blade by the thermocouple in real-time, and sending measurement results to the data collector for display, thereby realizing the measurement of turbine blade surface temperatures.

Compared with the existing techniques, this method for measuring surface temperatures of a turbine blade provided by the present application adopts a brand-new principle and structural design to form the thermocouple by connecting the turbine blade and the platinum material, thereby having the following advantages: firstly, the thermocouple is formed only by preparing one material (platinum material) on the surface of the turbine blade, making the preparation process simpler and thus effectively reducing measurement costs; secondly, the NiCrAlY buffer layer with a flat surface and a compact structure is prepared using the ion beam sputtering method, and the alumina insulating layer with micropores (nanometer level) is prepared using the sol-gel method and the dipping-coating method. The NiCrAlY buffer layer facilitates the release of thermal stress caused by the mismatch of thermal expansion coefficients between the turbine blade and the insulating layers, and the micropores promote the buffer release of thermal stress of the insulating layers when the temperature changes, so that the insulating layers do not accumulate thermal stress at high temperatures. Therefore, the present application effectively avoids the phenomenon of thermocouple failure such as cracking and falling off due to increased thermal stress at high temperatures, thus effectively enhancing the measurement reliability.

The application is applicable to turbine blade surface temperature measurement and effectively solves the problems of considerable measurement cost and poor measurement reliability of the existing methods for measuring the surface temperatures of a turbine blade.

DETAILED DESCRIPTION OF THE EMBODIMENTS

Figure 1:
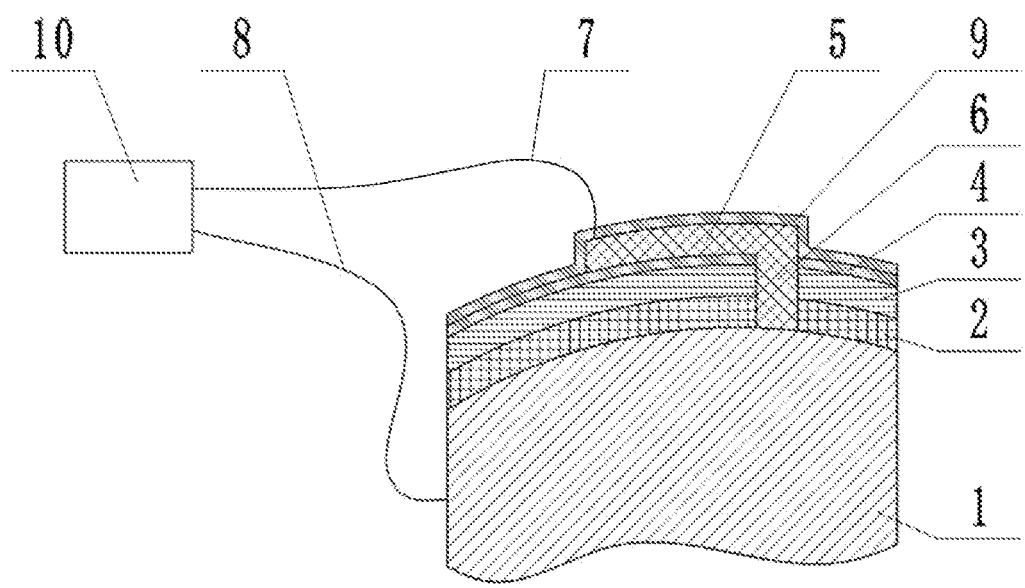
FIG. 1 is a schematic diagram of the present application.
Figure 2:
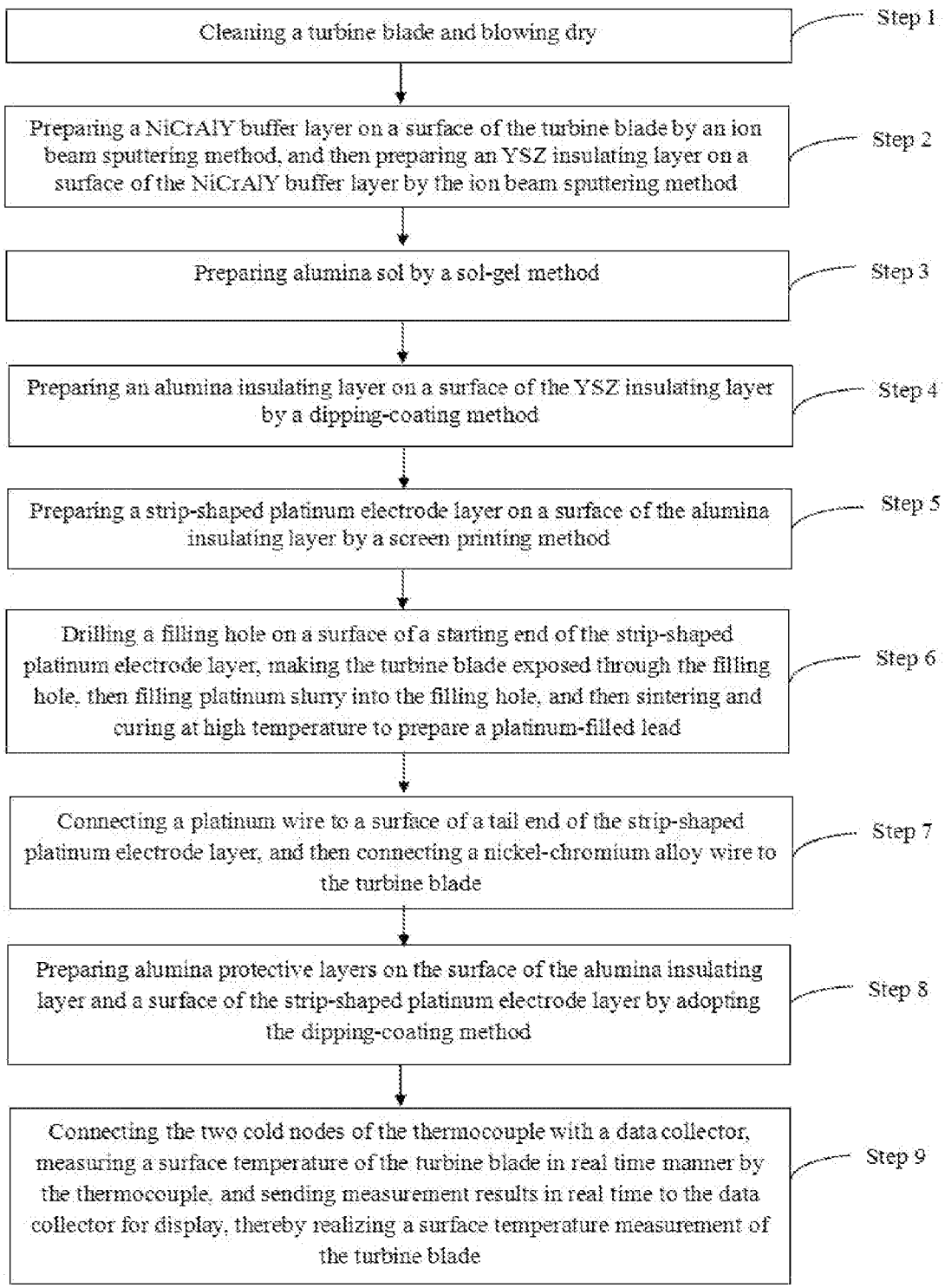
FIG. 2 is a flow chart of a method for measuring the surface temperatures of a turbine blade according to the present application.

A method for measuring the surface temperatures of a turbine blade as shown in FIG. 2 includes following steps:
step 1: cleaning a turbine blade 1 and blowing dry as shown in FIG. 1;
step 2: firstly, preparing a NiCrAlY (nickel-chromium-aluminum-yttrium) buffer layer 2 on a surface of the turbine blade 1 using an ion beam sputtering method, and then preparing an YSZ (yttria-stabilized zirconia) insulating layer 3 on a surface of the NiCrAlY buffer layer 2 using the ion beam sputtering method;
step 3, preparing alumina sol by a sol-gel method;
step 4, preparing an alumina insulating layer 4 on a surface of the YSZ insulating layer 3 using a dipping-coating method;
step 5, preparing a strip-shaped platinum electrode layer 5 on a surface of the alumina insulating layer 4 using a screen printing method;
step 6, firstly, drilling a filling hole on a surface of a starting end of the strip-shaped platinum electrode layer 5, making a metal surface of the turbine blade 1 exposed through the filling hole, then filling platinum slurry into the filling hole, and then sintering and curing at high temperatures to prepare a platinum-filled lead wire 6, thereby realizing electrical connection of the surface platinum electrode with the metal turbine blade;
step 7: firstly, connecting a platinum wire 7 to a surface of a tail end of the strip-shaped platinum electrode layer 5, and then connecting a nickel-chromium alloy wire 8 to a tenon end of the turbine blade 1;
step 8, preparing alumina protective layer 9 on the surface of the strip-shaped platinum electrode layer 5 and alumina insulating layer 4 by adopting the dipping-coating method; in this way, the turbine blade 1, the strip-shaped platinum electrode layer 5, the platinum-filled lead wire 6, the platinum wire 7 and the nickel-chromium alloy wire 8 jointly constitute a thermocouple; the turbine blade 1 is used as a positive pole of thermocouple, the strip-shaped platinum electrode layer 5 and the platinum-filled lead wire 6 together serve as a negative pole of the thermocouple, the platinum wire 7 and the nickel-chromium alloy wire 8 are used as two compensation wires of the thermocouple respectively; a connection point of the platinum-filled lead wire 6 and the turbine blade 1 is used as a hot junction for the thermocouple; a tail end of platinum wire 7 and a tail end of the nickel-chromium alloy wire 8 are used as two cold junctions of the thermocouple respectively; and
step 9, connecting the two cold junctions of the thermocouple with a data collector 10, measuring the surface temperature of the turbine blade 1 by the thermocouple in real-time, and sending measurement results to the data collector 10 for display, thereby realizing the measurement of turbine blade surface temperatures.

In an embodiment, the turbine blade 1 is made of nickel-based superalloy; the NiCrAlY buffer layer 2 has a thickness of 10 μm (micrometres)-50 μm; the YSZ insulating layer 3 has a thickness of 10 μm-50 μm; the alumina insulating layer 4 has a thickness of 1 μm-2 μm; the strip-shaped platinum electrode layer 5 has a thickness of 10 μm-50 μm and a length of 5 mm (millimeter); the aperture of the filling hole is 0.2 mm-1 mm; the thickness of alumina protective layers 9 is 1 μm-2 μm.

In an embodiment, the step 1 specifically includes: firstly, ultrasonically cleaning the turbine blade 1 in deionized water for 10 min (minutes) to remove particulate pollutants on the surface, then ultrasonically cleaning the turbine blade 1 in acetone solution for 10 min to remove organic pollutants on the surface, then ultrasonically cleaning the turbine blade 1 in ethanol solution for 10 min to remove residual acetone solution on the surface, then again ultrasonically cleaning the turbine blade 1 again in deionized water for 10 min to remove residual ethanol solution on the surface, and finally blowing dry the turbine blade 1 with nitrogen.

In an embodiment, in the step 2, specific parameters of the ion beam sputtering method are as follows: before sputtering, a vacuum chamber is pumped to a vacuum degree less than $1 \times 10^3$ Pa (pascal), an ion energy of ion source is 500 eV (electron volt)-1000 eV, an ion beam current of the ion source is 50-100 mA (milliampere), and the growth time of the film development is 30-60 min.

In an embodiment, in the step 3, preparing the alumina sol specifically includes: using aluminum isopropoxide as precursor, ethylene glycol ether as solvent and acetylacetone as chelating agent; firstly, fully grinding 0.02 mol (mole) of the aluminum isopropoxide, then adding into 50 mL (milliliter) of the ethylene glycol ether, putting into an ultrasonic cleaning machine for ultrasonic crushing for 0.5 h (hour), stirring with a magnetic stirrer at 70° C.-80° C. for 0.5 h, then dropping a proper amount of the acetylacetone, continuously stirring for 0.5 h, and finally dropping a proper amount of glacial acetic acid under stirring, and continuously stirring for 1 h to prepare the alumina sol; filtering for later use after the alumina sol is naturally cooled.

In an embodiment, in the step 4, preparing the alumina insulating layer 4 specifically includes: firstly, putting the alumina sol into a dip coater, then dipping the turbine blade 1 with the YSZ insulating layer 3 into the alumina sol, and then pulling the turbine blade 1 with the YSZ insulating layer 3 at a uniform pulling speed of 50 mm/min (millimeter/minute)-100 mm/min, forming an alumina liquid film on the surface of the YSZ insulating layer 3, then putting on a heating table and drying at 150° C. for 10 min, then putting into a drying oven and drying at 450° C. for 10 min, and finally putting into a tube furnace and annealing at 600° C. for 2 h to obtain the alumina insulating layer 4.

In an embodiment, in the step 5, preparing the strip-shaped platinum electrode layer 5 specifically includes: firstly, printing the strip-shaped platinum electrode layer 5 on the surface of the alumina insulating layer 4 by a screen printer, then putting into in a drying oven to dry at 150° C. for 20 min, and finally sintering and curing in a muffle furnace at 1000° C. for 1 h.

In an embodiment, the step 7 specifically includes: firstly, selecting the platinum wire 7, and adhering a starting end of the platinum wire 7 to the surface of the tail end of strip-shaped platinum electrode layer 5 with high-temperature conductive adhesive; then, selecting the nickel-chromium alloy wire 8, and adhering a starting end of the nickel-chromium alloy wire 8 to the turbine blade 1 with the high-temperature conductive adhesive; and then, putting into the drying oven and drying at 80° C. for 3 h.

In an embodiment, in the step 8, preparing the alumina protective layers 9 specifically includes: firstly, putting the alumina sol into the dip coater, then dipping the turbine blade 1 with the alumina insulating layer 4 and the strip-shaped platinum electrode layer 5 into the alumina sol, and then pulling the turbine blade 1 with the alumina insulating layer 4 and the strip-shaped platinum electrode layer 5 at a uniform pulling speed of 50 mm/min to 100 mm/min, forming an alumina liquid film on the surface of the alumina insulating layer 4 and the strip-shaped platinum electrode layer 5, then putting on the heating table and drying at 150° C. for 10 min, then putting into the drying oven and drying at 450° C. for 10 min, and finally putting into the tube furnace and annealing at 600° C. for 2 h to obtain the alumina protective layers 9.

Although specific embodiments of the present application have been described above, those skilled in the art should understand that these are only examples, and the scope of protection of the present application is defined by the appended claims. Those skilled in the art may make many changes or modifications to these embodiments without departing from the principle and essence of the present application, but these changes and modifications all fall within the protection scope of the present application.

What is claimed is:

1. A method for measuring surface temperatures of a turbine blade, comprising the following steps:
   step 1: cleaning the turbine blade and blowing dry;
   step 2: firstly, preparing a NiCrAlY buffer layer on a surface of the turbine blade by an ion beam sputtering method, and then preparing an YSZ insulating layer on a surface of the NiCrAlY buffer layer by the ion beam sputtering method;
   step 3, preparing alumina sol by a sol-gel method;
   step 4, preparing an alumina insulating layer on a surface of the YSZ insulating layer by a dipping-coating method;
   step 5, preparing a strip-shaped platinum electrode layer on a surface of the alumina insulating layer by a screen printing method;
   step 6, firstly, drilling a filling hole on a surface of a starting end of the strip-shaped platinum electrode layer, making the turbine blade exposed through the filling hole, then filling platinum slurry into the filling hole, and then sintering and curing at a high temperature to prepare a platinum-filled lead wire;
   step 7: firstly, connecting a platinum wire to a surface of a tail end of the strip-shaped platinum electrode layer, and then connecting a nickel-chromium alloy wire to the turbine blade;
   step 8, preparing alumina protective layers on the surface of the alumina insulating layer and a surface of the strip-shaped platinum electrode layer by adopting the dipping-coating method, wherein at this time, the turbine blade, the strip-shaped platinum electrode layer, the platinum-filled lead wire, the platinum wire and the nickel-chromium alloy wire jointly constitute a thermocouple; the turbine blade is used as a positive pole of the thermocouple, the strip-shaped platinum electrode layer and the platinum-filled lead wire together serve as a negative pole of the thermocouple, the platinum wire and the nickel-chromium alloy wire are used as two compensation wires of the thermocouple respectively; a connection between the platinum-filled lead wire and the turbine blade is used as a hot junction for the thermocouple; and a tail end of the platinum wire and a tail end of the nickel-chromium alloy wire are used as two cold junctions of the thermocouple respectively; and
   step 9, connecting the two cold junctions of the thermocouple with a data collector, measuring the surface temperatures of the turbine blade in real time by using the thermocouple, and sending measurement results in real time to the data collector for display, thereby realizing a surface temperature measurement of the turbine blade.

2. The method for measuring surface temperatures of a turbine blade according to claim 1, wherein the turbine blade is made of a nickel-based superalloy; the NiCrAlY buffer layer has a thickness of 10 µm-50 µm; the YSZ insulating layer has a thickness of 10 µm-50 µm; the alumina insulating layer has a thickness of 1 µm-2 µm; the strip-shaped platinum electrode layer has a thickness of 10 µm-50 µm and a length of 5 mm; an aperture of the filling hole is 0.2 mm-1 mm; and the alumina protective layers have a thickness of 1 µm-2 µm.

3. The method for measuring surface temperatures of a turbine blade according to claim 1, wherein step 1 specifically comprises: firstly, putting the turbine blade into deionized water for ultrasonic cleaning for 10 min to remove particulate pollutants on the surface, then putting the turbine blade into acetone solution for the ultrasonic cleaning for 10 min to remove organic pollutants on the surface, then putting the turbine blade into ethanol solution for the ultrasonic cleaning for 10 min to remove residual acetone solution on the surface, then putting the turbine blade again into the deionized water for the ultrasonic cleaning for 10 min to remove residual ethanol solution on the surface, and finally blowing dry the turbine blade with nitrogen.

4. The method for measuring surface temperatures of a turbine blade according to claim 1, wherein in step 2, specific parameters of the ion beam sputtering method are as follows: before sputtering, a vacuum chamber is pumped to a vacuum degree less than $1 \times 10^{-3}$ Pa, an ion energy of an ion source is 500 eV-1000 eV, an ion beam current of the ion source is 50-100 mA, and a duration for a film development is 30-60 min.

5. The method for measuring surface temperatures of a turbine blade according to claim 1, wherein in step 4, preparing the alumina insulating layer specifically comprises following steps: firstly, putting the alumina sol into a dip coater, then dipping the turbine blade with the YSZ insulating layer into the alumina sol, and then pulling the turbine blade with the YSZ insulating layer at a uniform pulling speed of 50 mm/min-100 mm/min, forming an alumina liquid film on the surface of the YSZ insulating layer, then putting the alumina liquid film on a heating table and drying at 150° C. for 10 min, then putting the alumina liquid film into a drying oven and drying at 450° C. for 10 min, and finally putting the dried alumina liquid film into a tube furnace and annealing at 600° C. for 2 h to obtain the alumina insulating layer.

6. The method for measuring surface temperatures of a turbine blade according to claim 1, wherein in step 5, preparing the strip-shaped platinum electrode layer specifically comprises following steps: firstly, printing the strip-shaped platinum electrode layer on the surface of the alumina insulating layer by a screen printer, then putting the strip-shaped platinum electrode layer into a drying oven to dry at 150° C. for 20 min, and then putting the dried strip-shaped platinum electrode layer into a muffle furnace to sinter and cure in at 1000° C. for 1 h.

7. The method for measuring surface temperatures of a turbine blade according to claim 1, wherein step 7 specifically comprises following steps: firstly, selecting the platinum wire, and adhering a starting end of the platinum wire to the surface of the tail end of strip-shaped platinum electrode layer with a high-temperature conductive adhesive; then, selecting the nickel-chromium alloy wire, and adhering a starting end of the nickel-chromium alloy wire to the turbine blade with the high-temperature conductive adhesive; then, putting the turbine blade together with the nickel-chromium alloy wire into a drying oven and drying at 80° C. for 3 h.

8. The method for measuring surface temperatures of a turbine blade according to claim 1, wherein in step 8, preparing the alumina protective layers specifically comprises following steps: firstly, putting the alumina sol into a dip coater, then dipping the turbine blade with the alumina insulating layer into the alumina sol, and then pulling the turbine blade with the alumina insulating layer at a uniform pulling speed of 50 mm/min to 100 mm/min, forming an alumina liquid film on the surface of the alumina insulating layer to obtain a turbine blade having the alumina liquid film, then putting the turbine blade having the alumina liquid film on a heating table and drying at 150° C. for 10 min, then putting the turbine blade having the alumina liquid film into a drying oven and drying at 450° C. for 10 min to obtain a dried alumina insulting layer, and finally putting the turbine blade having the alumina liquid film into a tube furnace and annealing at 600° C. for 2 h to obtain the alumina protective layers on the turbine blade.

\* \* \* \* \*